US007843076B2

(12) United States Patent
Gogoana et al.

(10) Patent No.: US 7,843,076 B2
(45) Date of Patent: Nov. 30, 2010

(54) HYDRAULIC ENERGY ACCUMULATOR

(75) Inventors: Marian V. Gogoana, Merrimack, NH (US); James B. Whitttaker, Arlington, VA (US)

(73) Assignee: Yshape Inc., Merrimack, NH (US)

( * ) Notice: Subject to any disclaimer, the term of this patent is extended or adjusted under 35 U.S.C. 154(b) by 292 days.

(21) Appl. No.: 11/947,238

(22) Filed: Nov. 29, 2007

(65) Prior Publication Data

US 2008/0136186 A1 Jun. 12, 2008

Related U.S. Application Data

(60) Provisional application No. 60/867,658, filed on Nov. 29, 2006.

(51) Int. Cl.
*F03B 13/10* (2006.01)
*F03B 13/12* (2006.01)
*H02P 9/04* (2006.01)
*F02B 63/04* (2006.01)

(52) U.S. Cl. ........................................ 290/42; 290/1 R

(58) Field of Classification Search .................. 290/42, 290/1 R

See application file for complete search history.

(56) References Cited

U.S. PATENT DOCUMENTS

| | | | | | |
|---|---|---|---|---|---|
| 3,163,985 | A | | 1/1956 | Bouyoucos | 60/398 |
| 3,405,278 | A | * | 10/1968 | Ley | 290/52 |
| 4,281,256 | A | | 7/1981 | Ahrens et al. | 290/1 R |
| 4,353,214 | A | | 10/1982 | Gardner | 60/652 |
| 4,674,280 | A | * | 6/1987 | Stuhr | 60/413 |
| 4,827,152 | A | * | 5/1989 | Farkas | 307/68 |
| 4,883,411 | A | * | 11/1989 | Windle | 417/331 |
| 5,186,822 | A | * | 2/1993 | Tzong et al. | 210/122 |
| 6,023,134 | A | * | 2/2000 | Carl et al. | 318/140 |
| 6,026,349 | A | * | 2/2000 | Heneman | 702/60 |
| 6,748,737 | B2 | * | 6/2004 | Lafferty | 60/398 |
| 7,155,912 | B2 | * | 1/2007 | Enis et al. | 60/652 |
| 7,464,551 | B2 | * | 12/2008 | Althaus et al. | 60/646 |
| 7,656,055 | B2 | * | 2/2010 | Torres et al. | 290/55 |
| 7,669,414 | B2 | * | 3/2010 | Loeffler | 60/414 |
| 7,694,513 | B2 | * | 4/2010 | Steenstrup et al. | 60/498 |
| 2002/0060500 | A1 | * | 5/2002 | Lafferty | 310/11 |
| 2007/0071613 | A1 | * | 3/2007 | Fries et al. | 417/73 |

(Continued)

*Primary Examiner*—T C Patel
*Assistant Examiner*—Pedro J Cuevas
(74) *Attorney, Agent, or Firm*—Nixon & Vanderhye, P.C.

(57) ABSTRACT

Example energy storage systems (20, 20', 20") comprises a fluid circuit (22, 22', 22") and an electrical unit (24, 24', 24") configured to operate as a motor in a first phase of operation and to operate as a generator in a second phase of operation. The fluid circuit (22, 22', 22") comprises a first fluid container (30, 30', 30") situated so content of the first fluid container experiences a first pressure level; a tank (32, 32', 32") having its content at a second pressure level (the second pressure level being less than the first pressure level): and, a first hydraulic motor/pump unit (34, 134, 34"connected to communicate a first working fluid between the tank and the first fluid container. In the first phase of operation electricity is supplied to the first hydraulic/motor unit (34, 134, 34") whereby the first hydraulic/motor unit transmits the first working fluid from the tank into the first fluid container (30, 30', 30"). In the second phase of operation pressurized first working fluid in the first fluid container (30, 30', 30") is transmitted from the first fluid container through the first hydraulic/motor unit 34, 134, 34") to the tank (32, 32', 32"), thereby causing the electrical unit (24, 24', 24") to generate electricity.

24 Claims, 10 Drawing Sheets

U.S. PATENT DOCUMENTS

| | | | | |
|---|---|---|---|---|
| 2009/0021012 | A1* | 1/2009 | Stull et al. | 290/44 |
| 2009/0139788 | A1* | 6/2009 | Miller | 180/165 |
| 2009/0179433 | A1* | 7/2009 | Kenney | 290/1 R |
| 2009/0230688 | A1* | 9/2009 | Torres et al. | 290/55 |
| 2010/0018196 | A1* | 1/2010 | Li et al. | 60/415 |
| 2010/0059999 | A1* | 3/2010 | Teng | 290/42 |
| 2010/0089063 | A1* | 4/2010 | McBride et al. | 60/682 |
| 2010/0107624 | A1* | 5/2010 | Loeffler | 60/415 |
| 2010/0133903 | A1* | 6/2010 | Rufer et al. | 307/22 |
| 2010/0139277 | A1* | 6/2010 | McBride et al. | 60/682 |

* cited by examiner

HYDRAULIC ENERGY ACCUMULATOR

This application claims the priority and benefit of U.S. Provisional Patent Application 60/867,658, filed Nov. 29, 2006, entitled "Hydraulic Energy Accumulator", which is incorporated herein by reference in its entirety.

BACKGROUND

I. Technical Field

This invention pertains to the storage of energy, and particularly to the storage of electricity during a low demand time period for retrieval during a high demand time period.

II. Related Art and Other Considerations

In many geographical or utility service areas the demand for electricity varies during a day or other time period. For example, power consumption during a hot summer day may be considerably greater than for the night. And typically the per unit cost of power is greater during a peak time period than for an off-peak or lower demand time period, with a kilowatt hour (KWH) sometimes being many times more expensive in peak demand time periods than in low demand periods.

Supply, delivery, and affordability of power during peak times can thus be problematic. For this reason in some localities or regions it can be advantageous to accumulate and store power (e.g., electricity) during non-peak time periods so that the stored power can instead be utilized during a peak demand time. In view of such factors as scarcity and/or the greater cost of electricity during peak demand times, the accumulation and storage of electricity for time re-distribution is often desirable, even though the act of accumulating and storing the electricity may itself consume energy.

Electrical power availability can be time re-distributed in several traditional ways. One way is to store electrical energy by pumping water to a high altitude during non-peak demand times and then turbining the water at peak hours for electricity generation. Other ways involve such techniques or mechanisms such as compressing air in caves (CAES) during non-peak demand times; use of flywheels, and chemical storage or the like. Example prior art techniques are non-exhaustively illustrated in U.S. Pat. Nos. 4,281,256; 3,163,985; and 4,353,214, for example.

Without electricity re-distribution techniques such as the foregoing, industry is forced to increase production capacity in order to meet ever increasing peak demands. And yet some of the existing electricity re-distribution techniques have their own disadvantages and inefficiencies.

BRIEF SUMMARY

An example energy storage system comprises a fluid circuit comprising an electrical unit configured to operate as a motor in a first phase of operation and to operate as a generator in a second phase of operation. The fluid circuit comprises a first fluid container situated so content of the first fluid container experiences a first pressure level; a tank having its content at a second pressure level (the second pressure level being less than the first pressure level): and, a first hydraulic motor/pump unit connected to communicate a first working fluid between the tank and the first fluid container. In the first phase of operation electricity is supplied to the first hydraulic/motor unit whereby the first hydraulic/motor unit transmits the first working fluid from the tank into the first fluid container. In the second phase of operation pressurized first working fluid in the first fluid container is transmitted from the first fluid container through the first hydraulic/motor unit to the tank, thereby causing the electrical unit to generate electricity.

In some example embodiments, the first hydraulic motor/pump unit is connected between the tank and the first fluid container; the first fluid container is situated below a reference pressure level; and the first fluid container is submerged. Pressure experienced by the first fluid container at the first pressure level occurs by reason of submersion and causes, during the second phase of operation, the first working fluid to be forced back to the tank. Transmission of the first working fluid back to the tank causes the first hydraulic motor/pump unit to operate as a motor to drive the electrical unit which operates as a generator of electricity.

In some example embodiments, the first fluid container comprises a first flexible bladder which is submerged in liquid (e.g., under a reference pressure level such as a surface level of the liquid, e.g., sea level). In some example embodiments, the fluid circuit and the electrical unit are also situated below the reference pressure level (e.g., below sea level). In such example embodiments, the system can further comprise a ballast configured to prevent at least a portion of the system from floating.

Another example embodiment of energy storage system further comprises a second fluid container; a second hydraulic motor/pump unit; and, a third hydraulic motor/pump unit. The second fluid container is situated so that content of the second fluid container is at a second container pressure level, the second container pressure level being less than the first pressure level. The second hydraulic motor/pump unit is operatively connected to the electrical unit and fluidically connected between the second fluid container and the third hydraulic motor/pump unit. The third hydraulic motor/pump unit is fluidically connected between the second hydraulic motor/pump unit and the first fluid container. The second hydraulic motor/pump unit and the third hydraulic motor/pump unit are configured during the first phase of operation to operate as pumps to transmit fluid from the second fluid container to the first fluid container. The second hydraulic motor/pump unit and the third hydraulic motor/pump unit are configured during the second phase of operation to operate as motors as fluid from the first fluid container is transmitted to the second fluid container. The electrical unit is configured during the first phase of operation to operate as the motor for the second hydraulic motor/pump unit and during the second phase of operation to operate as a generator driven by the second hydraulic motor/pump unit.

Another example embodiment of energy storage system further comprises a second fluid container, with the first hydraulic motor/pump unit being fluidically connected between the tank and the second fluid container for communicating a second working fluid between the tank and the second fluid container. In this example embodiment, the first working fluid comprises compressed gas. The first fluid container is submerged in a liquid and has a fluid container first internal region in communication with the liquid and a fluid container second internal region in communication with the compressed gas.

The first hydraulic motor/pump unit is configured during the first phase of operation to operate as a pump to transmit the second working fluid from the second fluid container to the tank and thereby drive the first working fluid from the tank to the fluid container first internal region and during the second phase of operation to operate as a motor as the second working fluid is driven by the first working fluid from the tank to the second fluid container. The electrical unit is configured during the first phase of operation to operate as the motor for the first hydraulic motor/pump unit and during the second phase of operation to operate as a generator driven by the first hydraulic motor/pump unit.

One or more of the example embodiments typically additionally comprises an electrical power source and a cable network configured during the first phase of operation to convey electricity from the electrical power source to the electrical unit to operate the electrical unit during the first phase of operation and configured during the second phase of operation to transmit electricity generated by the electrical unit to the electrical power source. In differing embodiments, the electrical power source can be a power grid; a storage cell; and/or a renewable power source. As an example implementation, a transformer may be connected on the cable network between the electrical power source and the electrical unit.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology.

Figure 1:
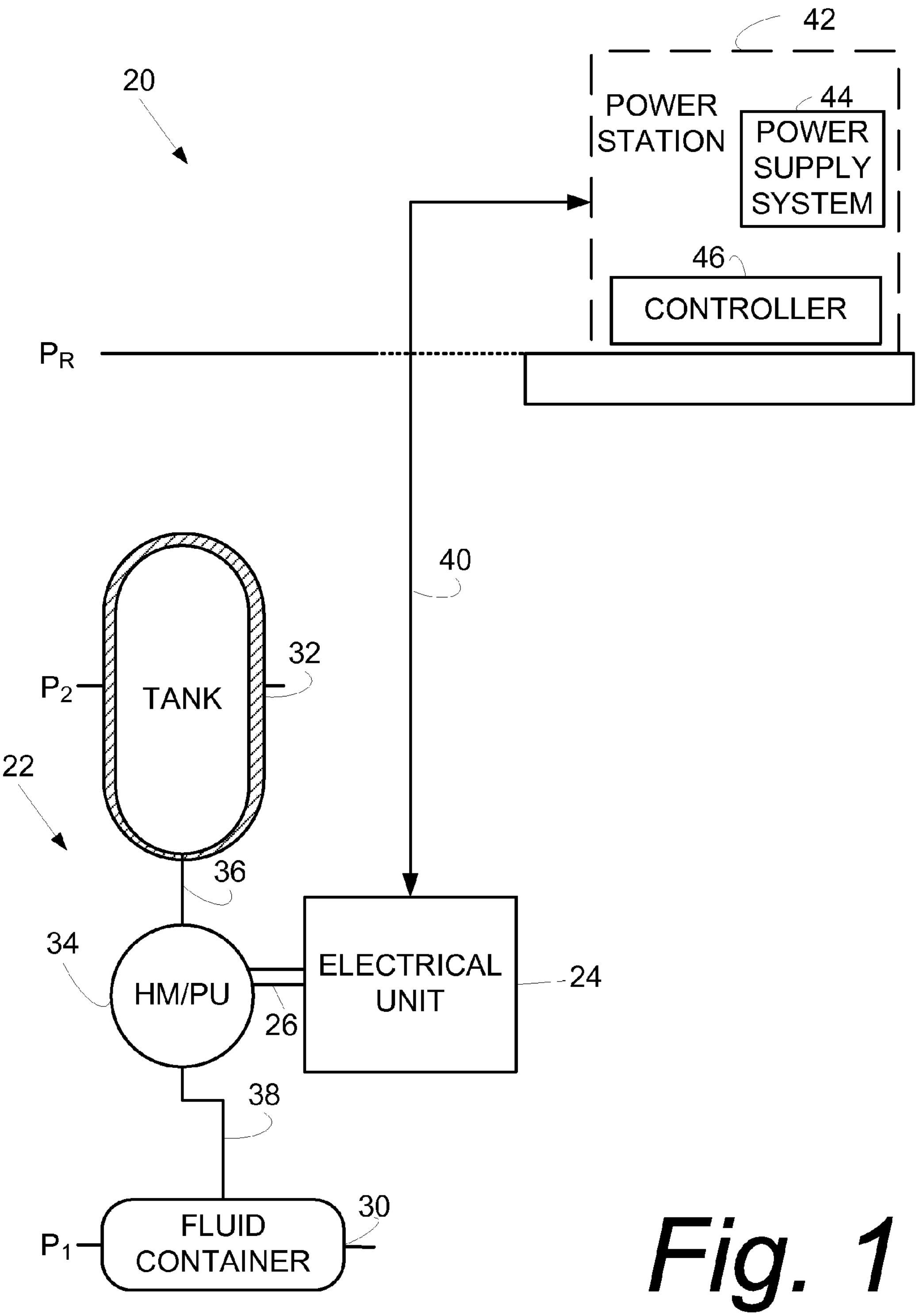
FIG. 1 is a schematic view of an energy storage system according to an example embodiment including a fluid circuit and an electrical unit.

FIG. 1 illustrates a first example embodiment of an energy storage system 20 which includes fluid circuit 22 and electrical unit 24. As explained herein, electrical unit 24 is connected to operate as a motor in a first phase of operation (e.g., to generate a torque through a rotatable shaft 26) and to operate as a generator in a second phase of operation (e.g., to generate an electrical current in response to rotation of shaft 26). Fluid circuit 22 comprises fluid container 30; tank 32; and hydraulic motor/pump unit (HM/PU) 34. In an example implementation of the first embodiment, fluid circuit 22 and electrical unit 24 are situated below a pressure reference level $P_R$, e.g., below sea level (meaning that fluid circuit 22 and electrical unit 24 are submerged in water or other liquid) or below ground level. "Submerged in liquid" or "submerged in water" can include, for example, submerged in a natural body of water such as the ocean or very deep lake, or submerged in a flooded mine, for example. Fluid container 30 is situated so that its content is pressurized at a first pressure level, e.g., at hydrostatic pressure $P_1$. For example, fluid container 30 can comprise a first flexible bladder. The content of tank 32 is at a second pressure level $P_2$ (e.g., vacuum). Thus, $P_2<P_1$ since, e.g., rigid walls of tank 32 isolate or insulate the content of tank 32 from any forces acting outside tank 32 and maintain vacuum within tank 32.

In fluid circuit 22 hydraulic motor/pump unit (HM/PU) 34 is connected to communicate a first working fluid between tank 32 and fluid container 30. For example, and as illustrated in FIG. 1, hydraulic motor/pump unit (HM/PU) 34 can be connected between tank 32 and fluid container 30 by appropriate fluidic tubes or pipes. For example, tank 32 is connected to hydraulic motor/pump unit (HM/PU) 34 through fluid tube 36 and hydraulic motor/pump unit (HM/PU) 34 is connected to fluid container 30 through fluid tube 38.

Figure 1A:
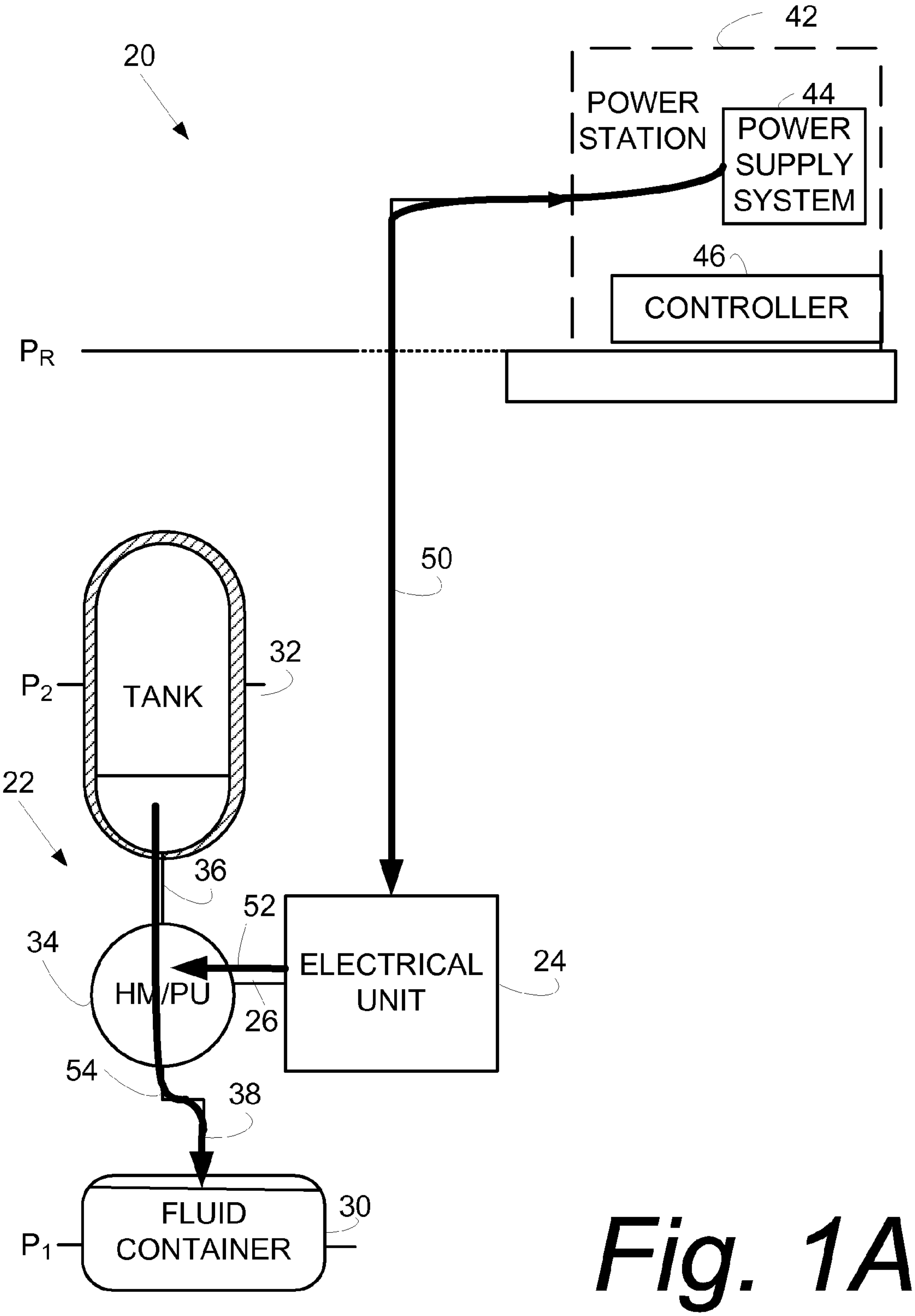
FIG. 1A is a schematic view showing operation of the energy storage system of FIG. 1 in a first phase of operation.

The electrical unit 24 is connected by cable network 40 to power station 42. In an example embodiment, power station 42 can comprise power supply system 44 and an optional power station controller 46. Electrical unit 24 is configured to supply a torque via rotation of shaft 26 to hydraulic motor/pump unit (HM/PU) 34 during a first phase of operation so that the hydraulic motor/pump unit (HM/PU) 34 operates as a pump and transmits a working fluid from tank 32 into fluid container 30. FIG. 1A shows the first phase of operation, and particularly shows by arrow 50 the power supply system 44 supplying electrical power to electrical unit 24. As depicted by arrow 52, the power received by electrical unit 24 during the first phase is used by electrical unit 24 to operate (via shaft 26) hydraulic motor/pump unit (HM/PU) 34 in a direction so that the working fluid stored in tank 32 is pumped through tubes 36 and 38 and into fluid container 30 in the manner depicted by arrow 54. In the implementation in which fluid container 30 comprises a first flexible bladder, the working fluid pumped into fluid container 30 causes the flexible bladder of fluid container 30 to volumetrically expand against hydrostatic pressure forces (pressure level $P_1$). Upon completion of the pumping of the first phase, fluid circuit 22 including hydraulic motor/pump unit (HM/PU) 34 is sealed or shut so that the working fluid does not escape from fluid container

30 back into tank 32. The sealing or shutting of the fluid circuit and thus the sealing of the working fluid in this manner may be accomplished by appropriate valves, e.g., either valves internal to hydraulic motor/pump unit (HM/PU) 34 or valves positioned downstream from hydraulic motor/pump unit (HM/PU) 34 (e.g., in tube 38 or at a mouth of fluid container 30). Such valve(s) can be controlled by a suitable controller such as controller 46. Thus, the controller can comprise electrical unit 24 or be situated at power station 42.

Figure 1B:
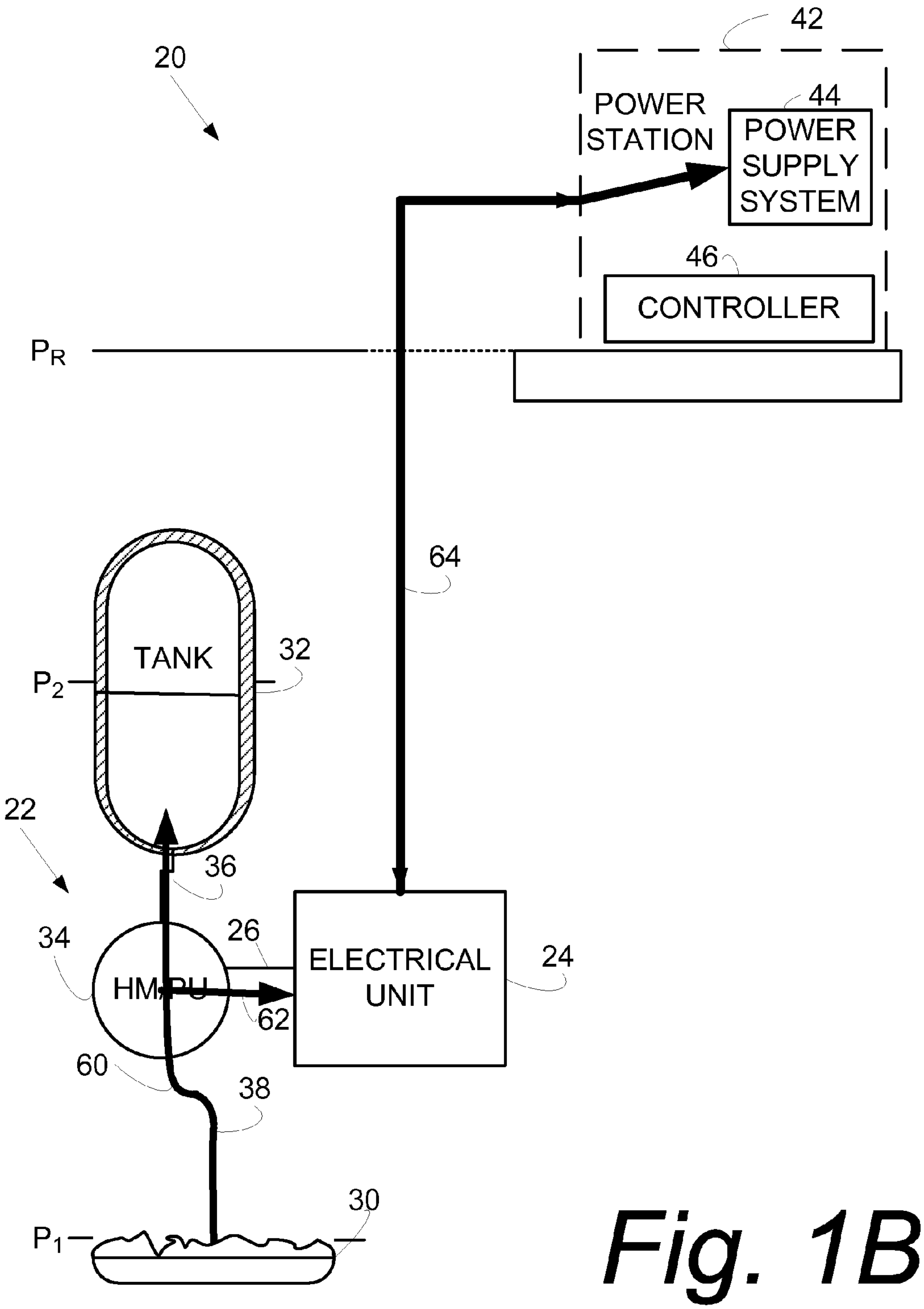
FIG. 1B is a schematic view showing operation of the energy storage system of FIG. 1 in a second phase of operation.

Electrical unit 24 is configured and controlled to generate electricity during the second phase of operation. FIG. 1B shows the second phase of operation, wherein fluid circuit 22 is open so that pressurized working fluid in fluid container 30 is transmitted from fluid container 30 through pipes 38 and 36 and through pump 34 in the manner depicted by arrow to tank 32. In other words, with fluid circuit 22 open, working fluid in fluid container 30 which is under hydrostatic pressure $P_1$ escapes through fluid circuit 22 to tank 32 where pressure $P_2$ (vacuum)$<$pressure $P_1$. In the second phase of operation, hydraulic motor/pump unit (HM/PU) 34 is operated in reverse, e.g., as a motor to turn shaft 26, so that the working fluid flowing therethrough turns an armature or the like at the end of shaft 26 so that electrical unit 24 generates electricity. The electricity generated by electrical unit 24 during the second phase of operation is applied on cable network 40 to power station 42 as depicted by arrow 64 in FIG. 1B.

In an example implementation illustrated in FIG. 2 wherein the energy storage system is submerged below sea level (SL), the system optionally comprises a ballast 70 configured to prevent the system from floating. The power station 42 is situated on land 72, or even partially on a floating platform. Preferably the power station 42 is situated above the pressure reference level $P_R$. In the example embodiment, cable network 40 conveys electricity from electrical power source 44 to electrical unit 24 for use of the electricity to operate electrical unit 24 during the first phase of operation.

As shown in the foregoing example, non-limiting embodiments, one "cell" comprises storage tank 32; an electrical motor/generator in the form of electrical unit 24 which is coupled to hydraulic motor/pump unit (HM/PU) 34; fluid container 30 (in the example form of a flexible (e.g., rubber) bladder); and switching means (e.g., valves) for the working fluid.

Figure 2:
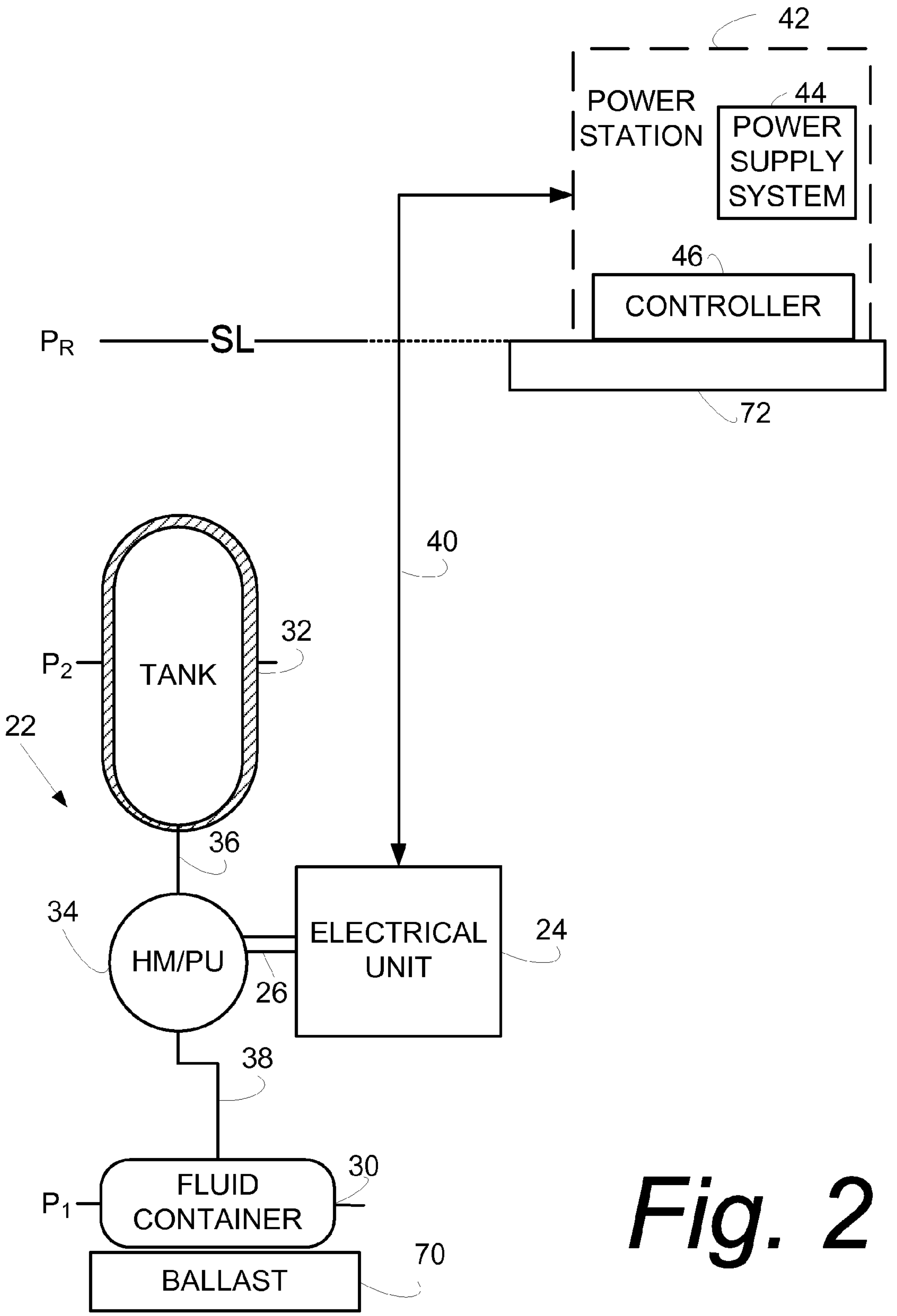
FIG. 2 is a schematic view of the energy storage system of FIG. 1 employed in a submerged implementation.

The FIG. 1 and FIG. 2 embodiment thus takes advantage of the pressure existent at great depth in water. The pressure tank 32 filled with working fluid and placed at great depth can be emptied with hydraulic motor/pump unit (HM/PU) 34 (during the first operational phase or accumulation period). For the second operational phrase or generation period, working fluid released back through hydraulic motor/pump unit (HM/PU) 34 causes electrical unit 24 to function as an electrical generator to generate electricity. As an example, at a depth of 2000 meters, one MWH can be stored in a tank of 14 m diameter.

This submerged embodiment offers better efficiency than, for instance, CAES technology, since in CAES air heats up when compressed (cooling/heating it leads to energy loss). Moreover, the submerged embodiment of FIG. 1 and FIG. 2 can also be located in many places around continental coasts, and thus does not suffer from geographical limitations such as those involved with CAES technology.

Figure 3:
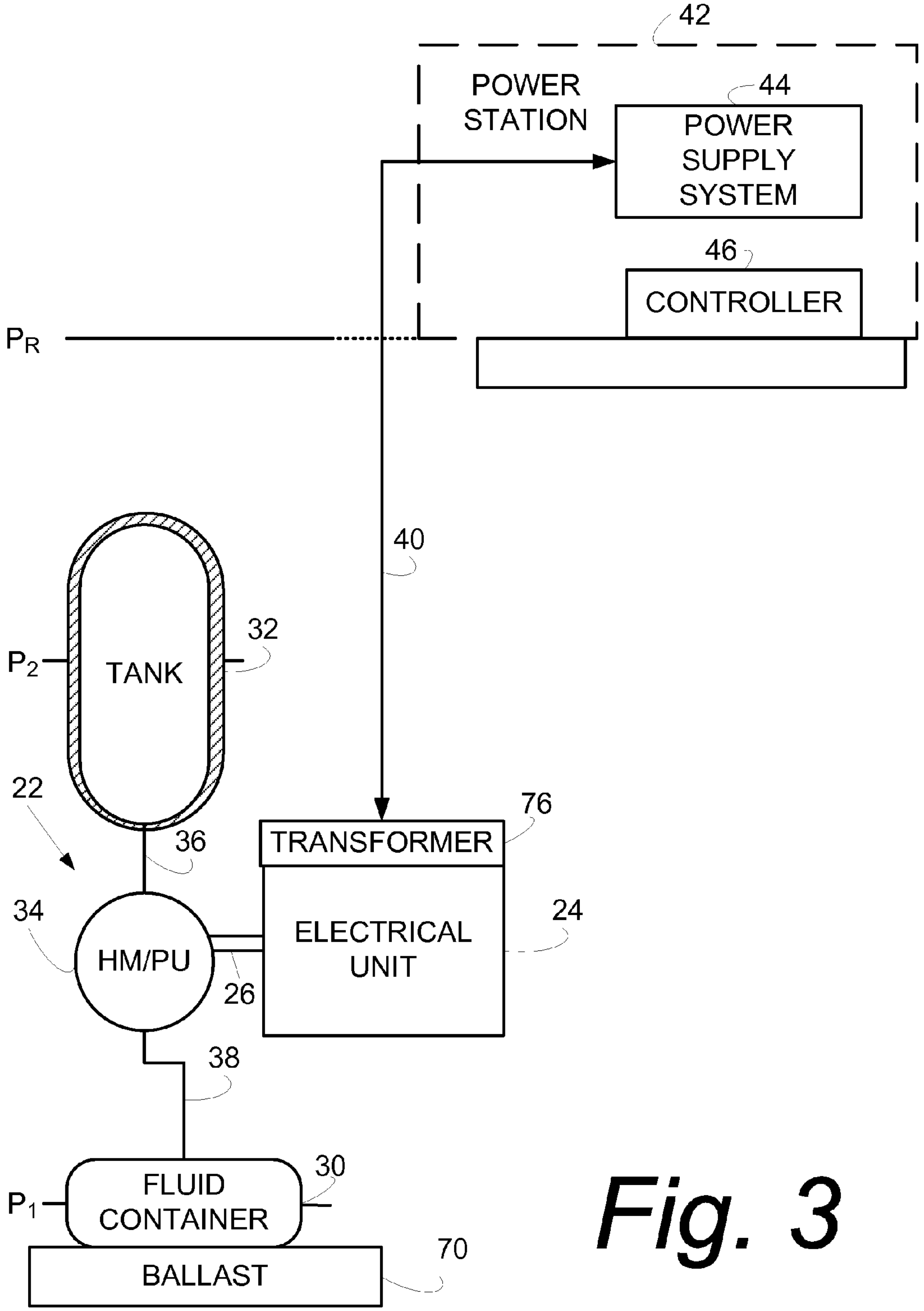
FIG. 3 is a schematic view of an energy storage system according to an example embodiment and further showing an example power station served by the energy storage system.

FIG. 3 shows an example implementation wherein transformer 76 is connected between electrical unit 24 and power station 42. Preferably transformer 76 is positioned at a relatively short distance from electrical unit 24, with a primary of transformer 76 being connected to electrical unit 24 and a secondary of transformer 76 being connected to power station 42. Thus, as understood from the FIG. 3 implementation which includes transformer 76, cable network 40 carries a stepped down power level from electrical unit 24 to power station 42. The transformer 76 is thus preferably submerged, and has adequate casement to prevent contact of transformer 76 with liquid. For example, transformer 76 can be provided in a same casement or liquid-tight housing as is electrical unit 24.

Figure 4:
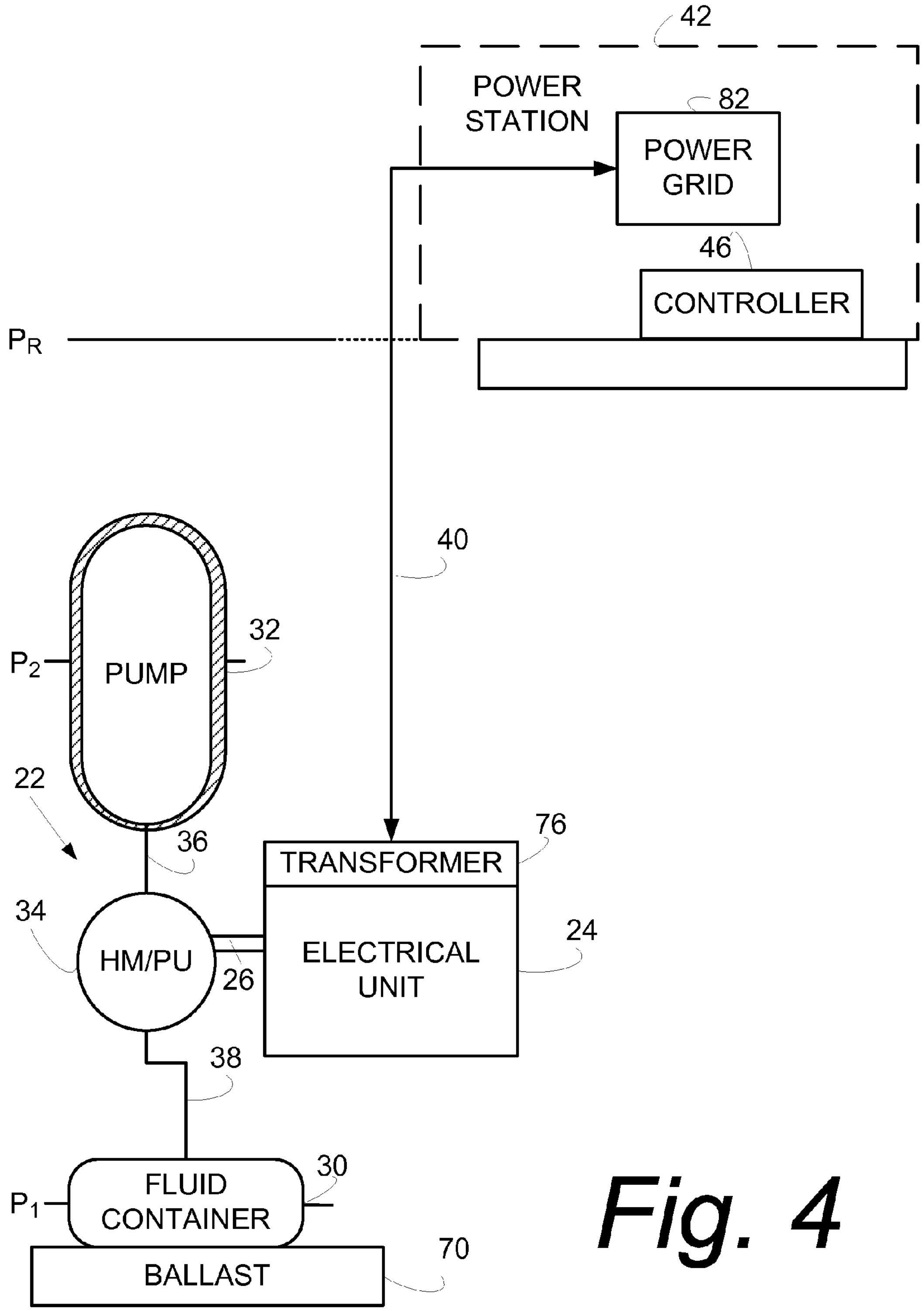
FIG. 4 is a schematic view of an energy storage system connected to a power supply system which is in the form of an electrical grid.
Figure 5:
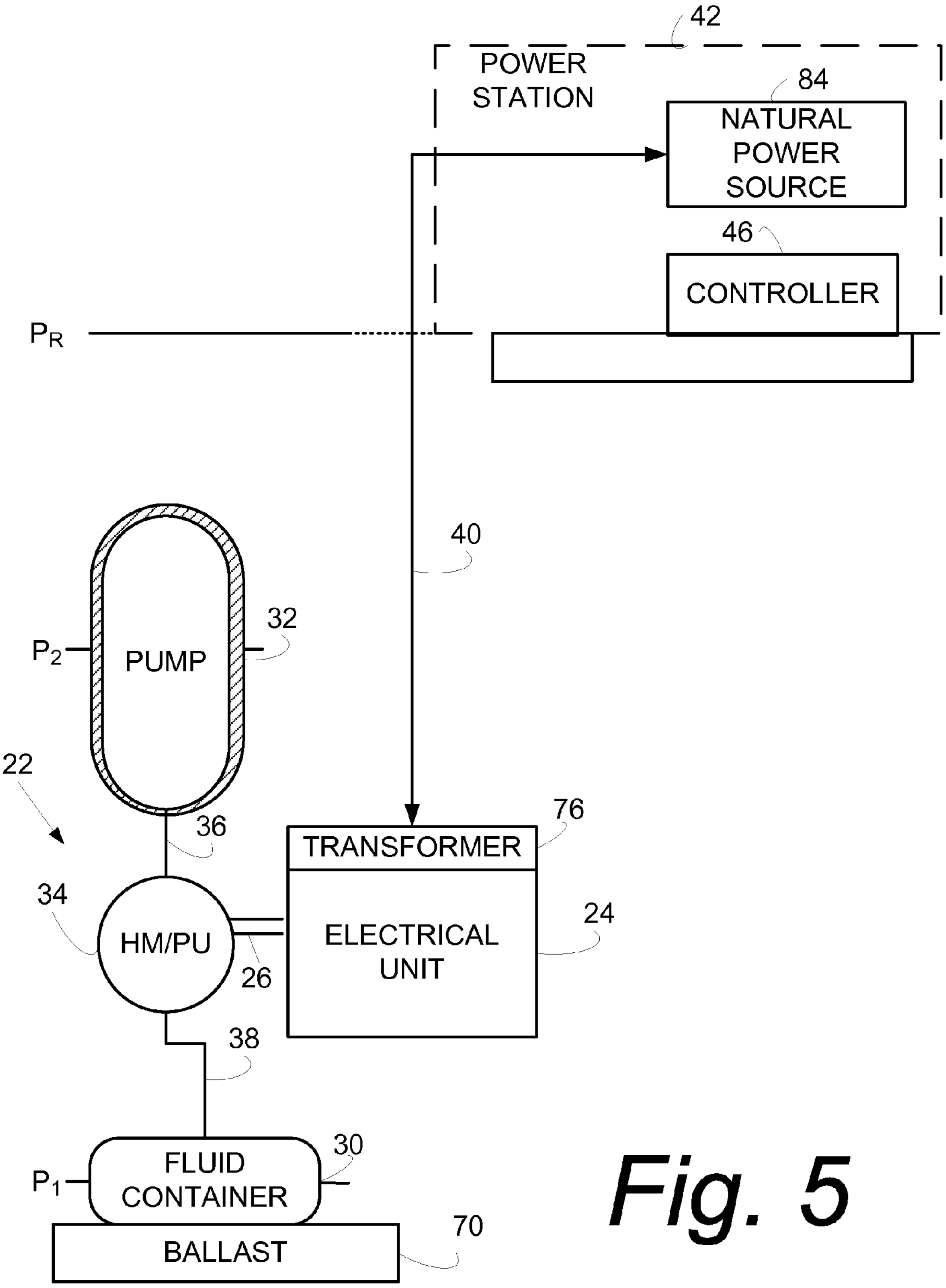
FIG. 5 is a schematic view of an energy storage system connected to a power supply system which is in the form of natural energy source such as a wind-driven power source.

In one example implementation illustrated in FIG. 4, the electrical power source (e.g., power supply system) of power station 42 is a power grid 82. In another example implementation illustrated in FIG. 5, the electrical power source of power station 42 is a natural or renewable power source 84 such as a wind-driven or solar power source. Thus, energy storage system 20 can be used not only for storing electricity from power grid 82, but also from "wind farms" or solar cells or the like floating directly above, creating a good match for remote islands, for instance.

In the FIG. 1 representation, the structure shown below the reference pressure constitutes a "cell". Plural cells, such as the one shown in FIG. 1 or other figures hereof, can be connected to power supply system 44 (whatever its type) on the shore or on land 72.

Figure 6:
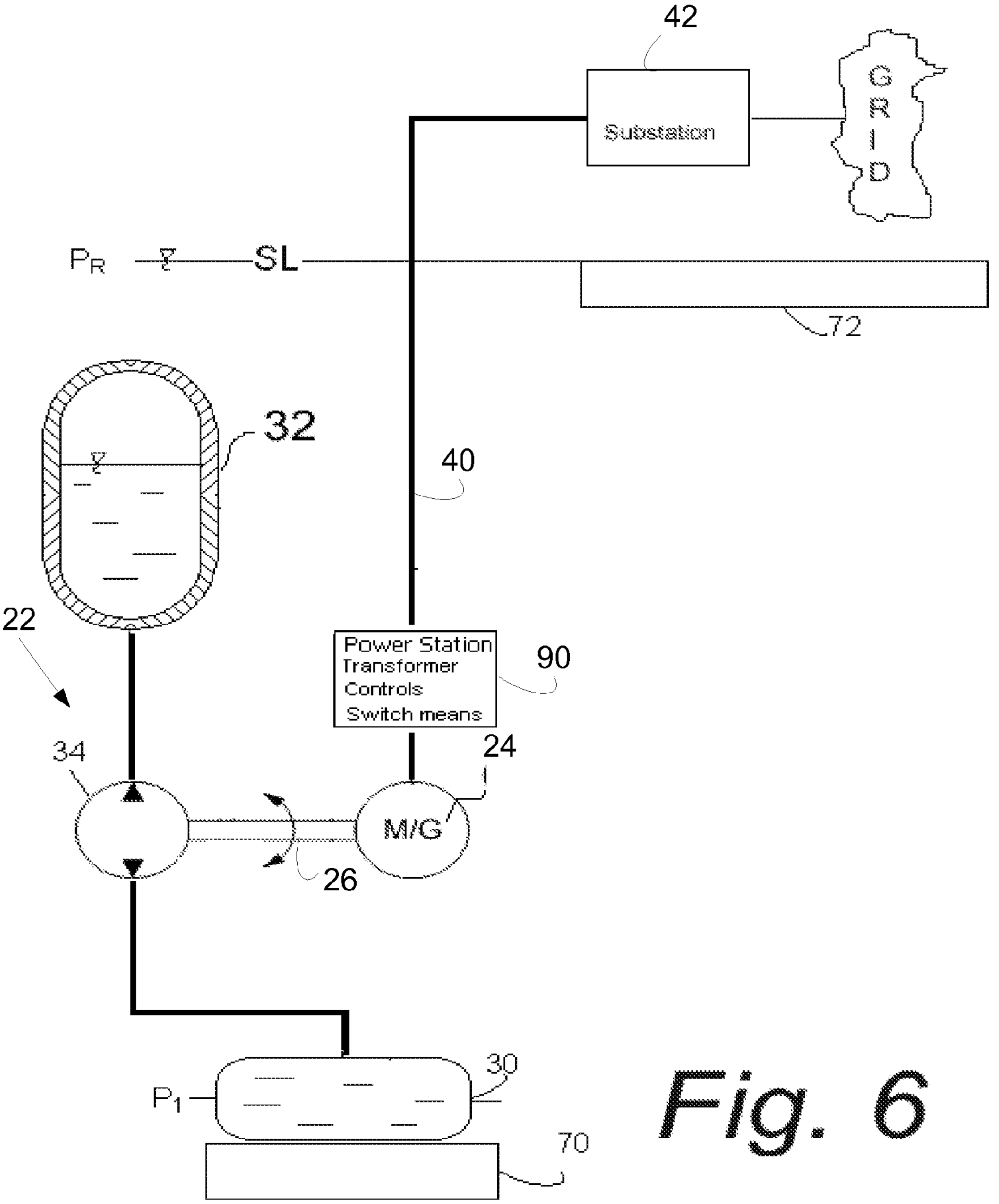
FIG. 6 is a schematic view of an energy storage system according to another example embodiment.

It should be appreciated that, in any of the foregoing or other embodiments described herein, at least portions of the power station 42 can be situated below the reference pressure level, e.g., below sea level. For example, as illustrated in FIG. 6, transformer and switching elements 90 can be located below the reference level or even comprise electrical unit 24. In fact, in some implementations the electrical unit 24 can have on one of its ends a motor/generator and on the other end a high voltage cable. In such implementation, the electrical unit 24 can hold electrical switches, a high voltage transformer, radio communication means, and so on. If submersed, the electrical unit 24 should be protected from water by a separation tank or other suitable structure (which may also include the motor/generator).

In a first phase or accumulation sequence of operation, the example embodiment of FIG. 6, the electrical energy is transported from surface through cable 40 and transformer/switching portions 90, reaching electrical unit 24 working as a motor. Through shaft 26 which connects electrical unit 24 and hydraulic motor/pump unit (HM/PU) 34, the mechanical energy activates the hydraulic motor/pump 34 that works as a pump. The pumping action performed by hydraulic motor/pump unit (HM/PU) 34 draws or even empties the working fluid from tank 32, thereby creating a vacuum in tank 32. The pumping action of hydraulic motor/pump unit (HM/PU) 34 pushes the working fluid into fluid container 30, which (particularly when in the form of a flexible bladder) finds itself under hydrostatic pressure. In this way the electrical energy is converted into mechanical energy and finally into potential energy proportional with the volume of the hydraulic fluid and the pressure difference between the tank 32 (vacuumed) and the fluid container 30. The fluid container 30 can be at a significant depth pressure, e.g., 100+ bar.

In a second phase of operation (also known as a recuperation/generation sequence), the potential energy is converted back into electrical energy. The hydraulic working fluid from fluid container 30 (under high pressure) activates the hydraulic motor pump 34 (now acting as a motor) and escapes into tank 32 (under no pressure). The mechanical energy goes back through shaft 26 to the electrical unit 24 (now acting as a generator). The electrical energy produced by electrical unit 24 goes to the switch 24 of power station portions 90, though cable 40, and back to the power grid.

The efficiency of a method such as that described above with reference to FIG. 6, for example, is improved in contrast to a CAES-type system, since the present method has no change in working fluid volume. The hydraulic working fluid used is incompressible compared with air used by CAES. This eliminates one of the biggest hurdles (since compressed air heats up significantly when it reaches 100-200 Barr).

Figure 7:
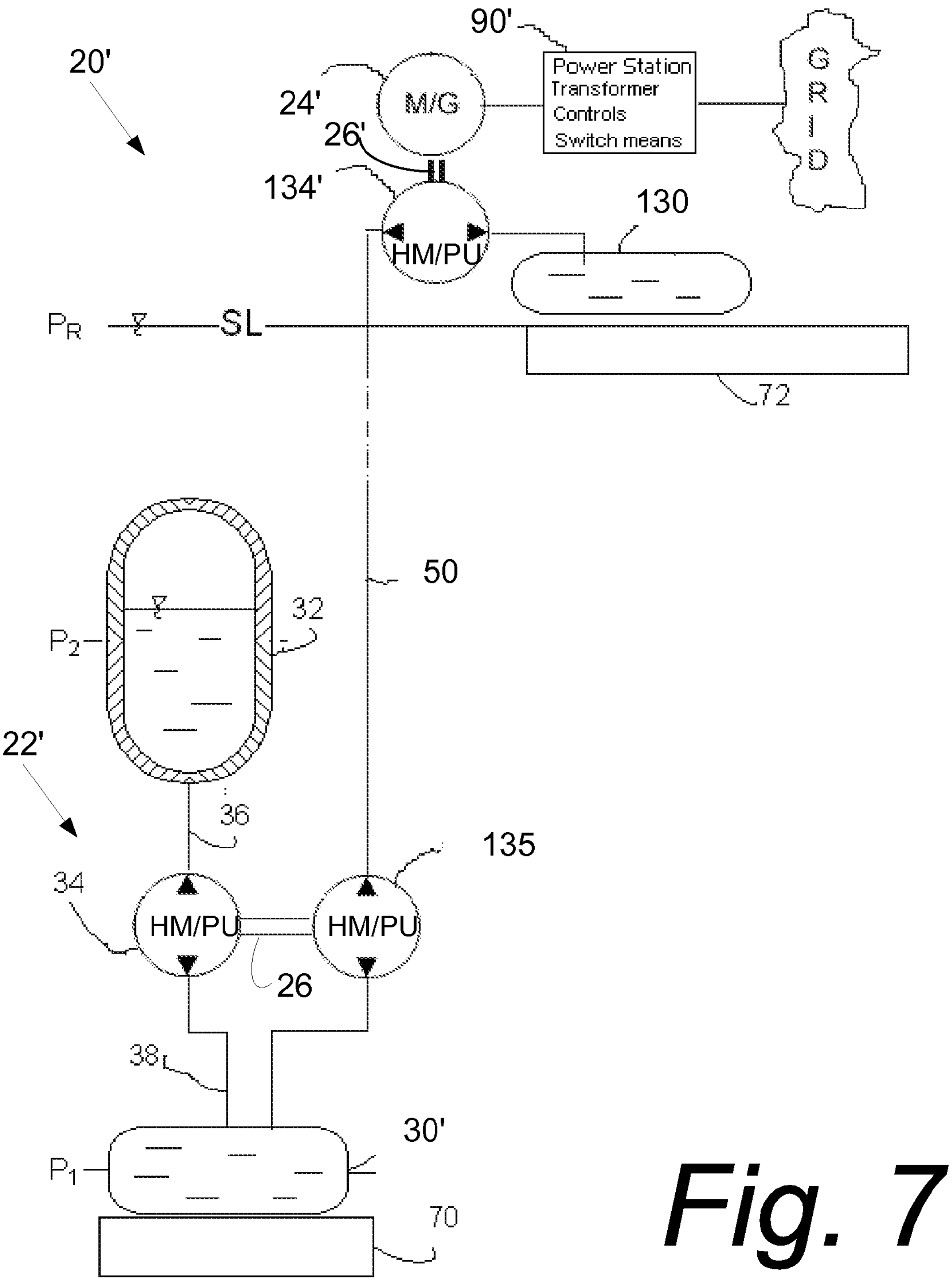
FIG. 7 is a schematic view of an energy storage system according to yet another example embodiment.

FIG. 7 illustrates another example embodiment of an energy storage system 20' which includes fluid circuit 22' and electrical unit 24'. Electrical unit 24' is connected through shaft 26' to operate as a motor in a first phase of operation and to operate as a generator in a second phase of operation. The energy storage system 20' further comprises, in addition to comparably numbered elements understood from previous embodiments, second fluid container 130; second hydraulic motor/pump unit 134; and, third hydraulic motor/pump unit 135. The second fluid container 130 is situated so that content of second fluid container 130 is at a second bladder pressure level $P_2$, the second flexible bladder pressure level being less than the first pressure level $P_1$. The second hydraulic motor/pump unit 134 is operatively connected to the electrical unit 24' and fluidically connected between the second fluid container 130 and third hydraulic motor/pump unit 135. The second hydraulic motor/pump unit 134 is connected by pipe 150 to third hydraulic motor/pump unit 135. The third hydraulic motor/pump unit 135 is fluidically connected between the second hydraulic motor/pump unit and fluid container 30'. The second hydraulic motor/pump unit 134 and the third hydraulic motor/pump unit 135 are configured during the first phase of operation to operate as pumps to transmit fluid from second fluid container 130 to fluid container 30'. The second hydraulic motor/pump unit 134 and third hydraulic motor/pump unit 135 are configured during the second phase of operation to operate as motors as fluid from the fluid container 30' is transmitted to second fluid container 130. The electrical unit 24' is configured during the first phase of operation to operate as the motor for the second hydraulic motor/pump unit 134 and during the second phase of operation to operate as a generator driven by the second hydraulic motor/pump unit 134.

The example embodiment of FIG. 7 thus brings to the surface (e.g., above reference level $P_R$) the transformer/switch 90' and motor-generator-serving electrical unit 24'. This has an advantage of avoiding the need for pressure chambers or sealants and the like which are needed around these electrical components when submerged or immersed.

In the FIG. 7 embodiment, the working fluid in pipe 50 is used as means for energy transfer between the surface and the depth, rather than an electrical cable such as shown in previous embodiments. At the surface, the electrical energy from the grid goes to switch 164 to electrical unit 24' coupled with the second hydraulic motor/pump unit 134 pumping the working fluid from second fluid container 130 to third hydraulic motor/pump unit 135. The second fluid container 130 can take the form of a second flexible bladder. The mechanical energy is transferred through shaft 92 to the hydraulic motor/pump unit (HM/PU) 34 and, as in the previous embodiment, empties tank 32 into fluid container 30, thereby storing potential energy in the first phase or accumulation phase.

At a time of peak electrical demand, the whole system of FIG. 7 works as a generator, operating essentially in reverse as understood from the foregoing description and embodiments. In particular, hydraulic motor/pump unit (HM/PU) 34 now reverses its operation to function as an hydraulic motor; third hydraulic motor/pump unit 135 operates as a hydraulic pump to pump working fluid up pipe 50 to second hydraulic motor/pump unit 134; 134 operates as a motor to drive electrical unit 24' to function as an electrical generator.

The embodiment of FIG. 7 thus employs high-pressure fluid to transfer energy between the cells (bottom of the ocean) and the surface. This enables the electrical power equipment (reversible pump-motor, generator, etc.) to function "dry" above water.

Figure 8:
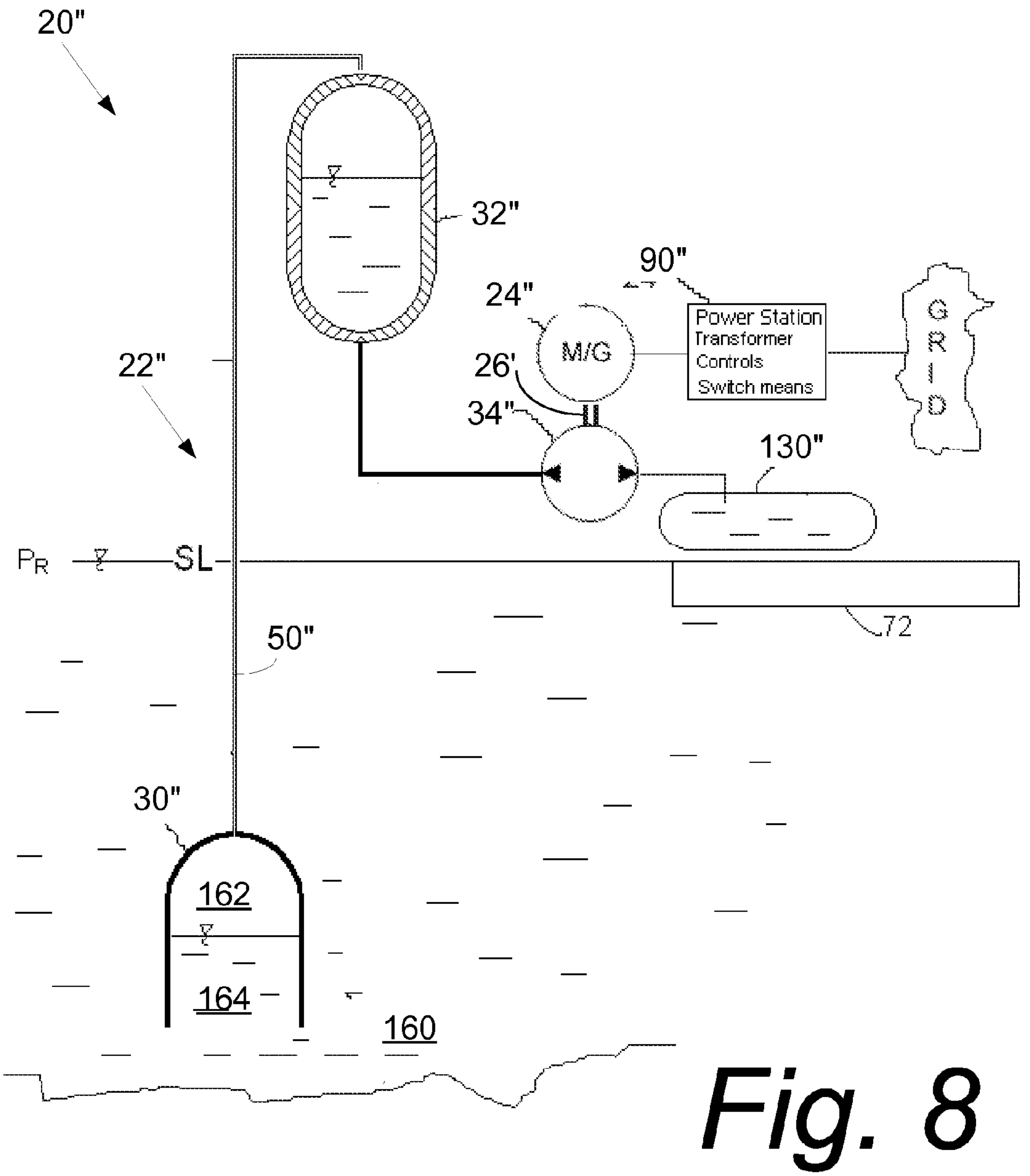
FIG. 8 is a schematic view of an energy storage system according to still yet another example embodiment.

FIG. 8 illustrates another example embodiment of an energy storage system 20" which includes fluid circuit 22" and electrical unit 24". Electrical unit 24" is connected to operate as a motor in a first phase of operation and to operate as a generator in a second phase of operation. The energy storage system 20" further comprises, in addition to comparably numbered elements understood from previous embodiments, second fluid container 130". Further, in the FIG. 8 embodiment the first hydraulic motor/pump unit 34" is fluidically connected between storage cell or tank 32" and second fluid container 130" for communicating a second working fluid between the tank 32" and the second fluid container 130". In the example embodiment of FIG. 8, the first working fluid comprises compressed gas which is communicated by hose or pipe 50" between tank 32" and fluid container 30". The first fluid container 30" is submerged in a liquid 160 and has a fluid container first internal region 162 in communication with the submerging liquid 160 and a fluid container second internal region 164 in communication with the compressed gas. The first hydraulic motor/pump unit 34" is configured during the first phase of operation to operate as a pump to transmit the second working fluid from the second fluid container 130" to the tank 32" and thereby drive the first working fluid from tank 32" to the first internal region 160 of fluid container 30".

The first hydraulic motor/pump unit 34" is configured during the second phase of operation to operate as a motor as the second working fluid is driven by the first working fluid from the tank 32" to the second fluid container 130". In this regard, escape of the first working fluid in the form of compressed gas from fluid container first internal region 162, as controlled by valves or the like in pipe 50" (or otherwise situated in fluid circuit 22") pushes the second working fluid from tank 32" through hydraulic motor/pump unit (HM/PU) 34" (acting as a motor) into second fluid container 130". The electrical unit 24" is configured during the first phase of operation to operate as the motor for the first hydraulic motor/pump unit 34" and during the second phase of operation to operate as a generator driven by the first hydraulic motor/pump unit 34".

For energy transport the FIG. 8 embodiment thus does not use an electrical cable or hydraulic fluid, but compressed fluid as the working fluid. The compressed fluid (e.g., compressed air) as the first working fluid is situated at the top of pressure tank 32" and thus presses down on the second working fluid (e.g., hydraulic fluid) in the same tank. In an example implementation, the compressed air of the first working fluid can have a pressure substantially equal to the depth pressure (which is constant) of the previous embodiments. This advantageously avoids compressing air from the atmospheric pressure, thereby overcoming a deficiency of other techniques such as CAES, for example.

In the first or accumulation phase of the FIG. 8 embodiment, electrical energy from the grid goes through the transformer/switch 90" to electrical unit 24" operating as a motor, coupled with hydraulic motor/pump unit (HM/PU) 34" operating as a pump. Pressure tank 32 is thus filled with the second working fluid, which pushes the first working fluid (e.g., compressed air) downwards through tube 50" into the opened chamber (e.g., fluid container first internal region 162) of fluid container 30".

In the second or recuperation-generating phase of the FIG. 8 embodiment, the second working fluid (e.g., hydraulic fluid) in tank 32" is simply turbined by hydraulic motor/pump unit (HM/PU) 34" acting as the hydraulic motor and through electrical unit 24" and transformer/switch 90" back to the grid.

The FIG. 8 embodiment comprises a long pressure pipe 50" between surface and depth, in an example implementation of considerable diameter (e.g., 6-12"), and a surface pressure tank (e.g., tank 32") with relatively thicker walls.

Systems as described herein can also be use deep in inundated mines. On the ocean, the "surface" should be a marine platform. Some embodiments have the advantage of installing the electrical generator and transformers (static converters if using direct current) above water. On the other hand, extra pressure tanks add to investment and friction on the downward air tube may decrease the recuperation factor.

Any suitable fluid as be used as the working fluid for communication between tank(s) and the flexible bladder(s). Examples of the working fluid include but are not limited to hydraulic fluid or hydraulic oil, glycol, or water with any form of lubricant inside.

One or more of the above-described embodiments have numerous advantages, such as (but not limited to): Being scalable; low prototype and production price; ability to be situated in multiple locations; consistency with actual energy policy trends; accessibility by submarines able to work at such depth; better storing efficiency than CAES. This storage device is remarkably inexpensive compared with investments for CAES or gravitational hydropower storage.

The foregoing embodiments thus provide electricity redistribution techniques suited for meeting increasing peak demands.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An energy storage system comprising:

a fluid circuit comprising:

a first fluid container situated so content of the first fluid container experiences a first pressure level;

a second fluid container situated so that content of the second fluid container is at a second container pressure level, the second container pressure level being less than the first pressure level;

a tank configured so that content of the tank is at a second pressure level, the second pressure level being less than the first pressure level;

a first hydraulic motor/pump unit connected to communicate a first working fluid between the tank and the first fluid container;

a second hydraulic motor/pump unit;

a third hydraulic motor/pump unit;

an electrical unit configured to operate as a motor in a first phase of operation and to operate as a generator in a second phase of operation, wherein in the first phase of operation electricity is supplied to the first hydraulic/motor unit Whereby the first hydraulic/motor unit transmits the first working fluid from the tank into the first fluid container, and wherein in the second phase of operation pressurized first working fluid in the first fluid container is transmitted from the first fluid container through the first hydraulic/motor unit to the tank thereby causing the electrical unit to generate electricity;

wherein the second hydraulic motor/pump unit is operatively connected to the electrical unit and fluidically connected between the second fluid container and the third hydraulic motor/pump unit, wherein the third hydraulic motor/pump unit is fluidically connected between the second hydraulic motor/pump unit and the first fluid container; and wherein the second hydraulic motor/pump unit and the third hydraulic motor/pump unit are configured during the first phase of operation to operate as pumps to transmit fluid from the second fluid container to the first fluid container, and during the second phase of operation to operate as motors as fluid from the first fluid container is transmitted to the second fluid container;

wherein the electrical unit is configured during the first phase of operation to operate as the motor for the second hydraulic motor/pump unit and during the second phase of operation to operate as a generator driven by the second hydraulic motor/pump unit.

2. The system of claim 1, wherein the first hydraulic motor/pump unit is connected between the tank and the first fluid container.

3. The system of claim 1, wherein the first fluid container comprises a first flexible bladder.

4. The system of claim 1, further comprising a ballast configured to prevent at least a portion of the system from floating.

5. The system of claim 1, further comprising:

an electrical power source;

a cable network configured during the first phase of operation to convey electricity from the electrical power source to the electrical unit to operate the electrical unit during the first phase of operation and configured during the second phase of operation to transmit electricity generated by the electrical unit to the electrical power source.

6. The system of claim 5, wherein the electrical power source is a power grid, a storage cell, or a renewable power source.

7. The system of claim 5, further comprising a transformer connected on the cable network between the electrical power source and the electrical unit.

8. The system of claim 1, wherein the second pressure level is vacuum;

and wherein the first fluid container is submerged whereby the first pressure level is hydrostatic pressure.

9. An energy storage system comprising:

a fluid circuit comprising:

a first fluid container situated so content of the first fluid container experiences a first pressure level;

wherein the first fluid container is submerged in a liquid, the first fluid container having a fluid container first internal region in communication with the liquid and a fluid container second internal region in communication with a first working fluid;

a tank configured so that content of the tank is at a second pressure level, the second pressure level being less than the first pressure level;

a first hydraulic motor/pump unit connected to communicate a first working fluid between the tank and the first fluid container;

a second fluid container, the first hydraulic motor/pump unit being fluidically connected between the tank and the second fluid container for communicating a second working fluid between the tank and the second fluid container;

an electrical unit configured to operate as a motor in a first phase of operation and to operate as a generator in a second phase of operation;

wherein the first hydraulic motor/pump unit is configured during the first phase of operation to operate as a pump to transmit the second working fluid from the second fluid container to the tank and thereby drive the first working fluid from the tank to the fluid container first internal region and during the second phase of operation to operate as a motor as the second working fluid is driven by the first working fluid from the tank to the second fluid container;

wherein the electrical unit is configured during the first phase of operation to operate as the motor for the first hydraulic motor/pump unit and during the second phase of operation to operate as a generator driven by the first hydraulic motor/pump unit.

10. The system of claim 9, wherein the second pressure level is vacuum;

and wherein the first fluid container is submerged whereby the first pressure level is hydrostatic pressure.

11. The system of claim 9, wherein the first fluid container comprises a first flexible bladder.

12. The system of claim 9, wherein the first working fluid is compressed gas.

13. The system of claim 9, further comprising:

an electrical power source;

a cable network configured during the first phase of operation to convey electricity from the electrical power source to the electrical unit to operate the electrical unit during the first phase of operation and configured during the second phase of operation to transmit electricity generated by the electrical unit to the electrical power source.

14. The system of claim 13, wherein the electrical power source is a power grid, a storage cell, or a renewable power source.

15. The system of claim 13, further comprising a transformer connected on the cable network between the electrical power source and the electrical unit.

16. A method of operating an energy storage system, the method comprising:

situating a first fluid container so content of the first fluid container experiences a first pressure level;

situating a second fluid container situated so that content of the second fluid container is at a second container pressure level, the second container pressure level being less than the first pressure level;

situating a tank so that content of the tank is at a second pressure level, the second pressure level being less than the first pressure level:

providing an electrical unit configured to operate as a motor in a first phase of operation and to operate as a generator in a second phase of operation:

providing a first hydraulic motor/pump unit, a second hydraulic motor/pump unit, and a third hydraulic motor/pump unit;

the second hydraulic motor/pump unit being operatively connected to the electrical unit and fluidically connected between the second fluid container and the third hydraulic motor/pump unit, wherein the third hydraulic motor/pump unit is fluidically connected between the second hydraulic motor/pump unit and the first fluid container;

. communicating a first working fluid between the tank and the first fluid container in a first direction during the first phase of operation and in a second direction during the second phase of operation, in the first phase of operation supplying electricity to the first hydraulic/motor unit whereby the first hydraulic/motor unit transmits the first working fluid from the tank into the first fluid container:

in the second phase of operation transmitting pressurized first working :fluid in the first fluid container from the first fluid container through the first hydraulic/motor unit to the tank thereby causing the electrical unit to generate electricity;

during the first phase of operation operating the second hydraulic motor/pump unit and the third hydraulic motor/pump unit as pumps to transmit fluid from the second fluid container to the first fluid container, during the second phase of operation operating the second hydraulic motor/pump unit and the third hydraulic motor/pump unit as motors as fluid from the first fluid container is transmitted to the second fluid container;

during the first phase of operation operating the electrical unit as the motor for the second hydraulic motor/pump unit; and during the second phase of operation operating the electrical unit as a generator driven by the second hydraulic motor/pump unit.

17. The method of claim16, further comprising using a ballast to prevent at least a portion of the system from floating.

18. The method of claim 16, wherein at least one of the first fluid container and the second fluid container is a flexible bladder.

19. A method of operating an energy storage system, the method comprising:

situating a first fluid container so content of the first fluid container experiences a first pressure level;

situating a tank so that content of the tank is at a second pressure level, the second pressure level being less than the first pressure level;

providing an electrical unit configured to operate as a motor in a first phase of operation and to operate as a generator in a second phase of operation;

providing a second fluid container with a first hydraulic motor/pump unit being fluidically connected between the tank and the second fluid container for communicating a second working fluid between the tank and the second fluid container;

submerging the first fluid container in a liquid and providing in the first fluid container a fluid container first internal region in communication with the liquid and a fluid container second internal region in communication with the first working fluid;

communicating the first working fluid between the tank and the first fluid container in a first direction during the first phase of operation and in a second direction during the second phase of operation, during the first phase of operation operating the first hydraulic motor/pump unit as a pump to transmit the second working fluid from the second fluid container to the tank and thereby drive the first working fluid from the tank to the fluid container first internal region;

during the second phase of operation operating the hydraulic motor/pump unit as a motor as the second working fluid is driven by the first working fluid from the tank to the second fluid container;

during the first phase of operation operating the electrical unit as the motor for the first hydraulic motor/pump unit; and during the second phase of operation operating the electrical unit as a generator driven by the first hydraulic motor/pump unit.

20. The method of claim 19, wherein the first working fluid is compressed gas.

21. An energy storage system comprising:

a fluid circuit comprising:

a fluid container submerged in a liquid;

a storage cell situated above a surface of the liquid;

connecting means for fluidically connected the fluid container and the storage cell;

a first hydraulic motor/pump unit connected to communicate a pressurized fluid between the storage cell and the fluid container through the connecting means;

an electrical unit situated above the surface of the liquid and configured to operate as a motor in a first phase of operation and to operate as a generator in a second phase of operation, wherein in the first phase of operation the first hydraulic/motor unit transmits the pressurized fluid from the storage cell into the first fluid container, and wherein in the second phase of operation the pressurized fluid in the fluid container is transmitted from the fluid container to the storage cell thereby causing the electrical unit to generate electricity.

22. A method of operating an energy storage system, the method comprising:

submerging a fluid container in a liquid;

situating a storage cell above a surface of the liquid;

providing, above the surface of the liquid, an electrical unit configured to operate as a motor in a first phase of operation and to operate as a generator in a second phase of operation;

communicating a pressurized fluid between the storage cell and the fluid container in a first direction during the first phase of operation and in a second direction during the second phase of operation, in the first phase of operation supplying electricity to the first hydraulic/motor unit whereby the first hydraulic/motor unit causes the pressurized fluid to be transmitted from the storage cell into the fluid container;

in the second phase of operation transmitting the pressurized fluid in the fluid container from the fluid container to the storage cell thereby causing the electrical unit to generate electricity.

23. The method of claim 22, further comprising using a first flexible bladder as the first fluid container.

24. The method of claim 22, further comprising situating the fluid circuit and the electrical unit below the reference pressure level.

* * * * *